United States Patent [19]
Hubbard

[11] Patent Number: 5,463,984
[45] Date of Patent: Nov. 7, 1995

[54] ONE WAY ANIMAL GATE

[76] Inventor: Leslie H. Hubbard, 480 Ashville Cir., Montevallo, Ala. 35115

[21] Appl. No.: 297,056
[22] Filed: Aug. 29, 1994
[51] Int. Cl.⁶ .............................. A61D 3/00; A01K 29/00
[52] U.S. Cl. .......................................................... 119/840
[58] Field of Search ............................. 119/20, 729, 730, 119/731, 734, 738, 840, 843, 740, 750

[56] References Cited

U.S. PATENT DOCUMENTS

| | | | |
|---|---|---|---|
| 1,381,797 | 6/1921 | Caspers | 119/840 |
| 1,444,769 | 2/1923 | Abernathy | 119/731 X |
| 2,099,956 | 11/1937 | Flatley | 119/731 |
| 2,731,744 | 1/1956 | Schnell | 119/20 X |
| 3,797,463 | 3/1974 | McCrery, Jr. | 119/840 |
| 3,894,516 | 7/1975 | Schaefer | 119/840 |
| 4,019,464 | 4/1977 | Miller | 119/840 |
| 4,026,069 | 5/1977 | Bohnett | 119/840 X |
| 4,116,166 | 9/1978 | Gofflot | 119/730 |
| 4,813,379 | 3/1989 | Harmsen | 119/840 |

FOREIGN PATENT DOCUMENTS 2173386  10/1986  United Kingdom ............. 119/731

*Primary Examiner*—Thomas Price
*Attorney, Agent, or Firm*—John C. Garvin, Jr.

[57] ABSTRACT

A one way animal gate for easy passage of animals in one direction through the gate and for prevention of passage of the animals in the opposite direction. The one way animal gate includes a pair of doors or a single door hinged to a frame, one or more spring elements for normally urging the doors or door to their closed positions, and a stop for preventing movement of the doors or door beyond a desired position to prevent movement of the animals in an undesired direction. The one way animal gate is placed in an opening in a fence line dividing a pasture, paddock or the like.

8 Claims, 2 Drawing Sheets

5,463,984

ONE WAY ANIMAL GATE

FIELD OF THE INVENTION

This invention relates to a one way gate apparatus designed for installation in an opening in a fence for animal management, and more particularly to a one way gate apparatus which allows an animal such as cattle to move in a desired direction but preventing movement of the animal in an undesired direction.

BACKGROUND OF THE INVENTION

Those involved in the management of animals have long used manual gates to corral and contain animals such as cattle, horses and pigs on a desired side of a fence dividing a pasture, paddock or the like. The manual gates are installed in an opening in a fence line and generally require human effort and attention to permit the animals to pass through the opening from one side of the fence to the other side of the fence. Once an animal has moved through the opening, the gate must be manually closed to prevent the animal from returning to the original side of the fence. This corralling operation requires considerable human effort and time.

While there are several one way gate apparatuses which allow the movement of animals in one direction but prevent movement of animals in the opposite direction in the prior art, they possess numerous disadvantages and deficiencies. Of the several, known, prior art one way gate apparatuses, those disclosed and claimed in U.S. Pat. Nos. 3,079,711, 3,803,763, 4,953,323 and 5,081,958 are the most relevant to the subject matter of the invention disclosed herein.

U.S. Pat. No. 3,079,711 discloses a one way animal gate comprising a chute having two vertical side walls, each side walls being equipped with an upright post, a tube pivotally secured to a respective upright post by a bracket and hinge pin, springs for urging the tubes to a closed position, and stop lugs for limiting the opening movement of the tubes. U.S. Pat. No. 3,803,763 discloses a one way deer gate for installation in an opening of a fence, the deer gate comprising a pair of vertical posts, upper and lower horizontal frame bars, a pair of vertical side bars secured to a respective vertical post, a plurality of spring tines secured to each vertical side bars, a plurality of spring tines secured to the lower frame bar, and a spring tine secured to the upper, horizontal, frame bar, with the limited opening afforded by the ends of the spring side tines and the obstacles presented by the outer ends of the upper and lower tines preventing passage of the deer in one direction, but allowing passage of the deer in the opposite direction. Each of U.S. Pat. Nos. 4,953,323 and 5,081,958 discloses a one way animal gate for installation in an opening of a fence, the gate including a smooth, inclined, bottom surface surrounded by two sides extending upwardly from the bottom surface and depending upon the contour of the land to allow movement of an animal from one side of a fence to the other side but preventing movement of the animal in the reversed direction.

The present invention overcome the numerous disadvantages and deficiencies of the prior art animal gate apparatuses as well as provides several advantages thereover in that no human effort is required to open and close the gate, the parts comprising the gate apparatus is not likely to injure the animal, no particular contour or slope of the land is required at the opening in the fence where the gate is installed, and the one way gate apparatus of the present invention is easily installed, durable and made of relatively inexpensive materials. The apparatus of the present invention, once in place, allows an animal to readily move from one side of a fence to the other side of the fence if such movement is desired by the owner of the animal.

SUMMARY OF THE INVENTION

According to the present invention, there is provided a one way animal gate which allows animals such as cattle, horses, pigs or the like to move in a desired direction, but prevents movement of the animal in an undesired direction. The one way animal gate of the first embodiment of the present invention includes a pair of doors pivotally hinged on a frame secured to spaced, vertical, posts of a fence which vertical posts form an opening in the fence. The one way gate of the second embodiment of the present invention includes a single door pivotally hinged on a frame secured to a vertical post of a fence, which post together with another vertical post, form an opening in the fence. The one way gate of both embodiments of the invention includes means for urging the door(s) to a closed position and for preventing the door(s) from swinging beyond a certain point in an undesired direction.

Accordingly, it is an object of the present invention to provide a one way gate apparatus for animals which is simple in construction and relatively inexpensive to manufacture.

It is a further object of the present invention to provide a one way gate apparatus for animals which is simple in construction, relatively inexpensive to manufacture, and reliable to allow an animal to move from one side of a fence in a desired direction, but preventing the animal from moving back to the original side of the fence.

It is still a further object of the present invention to provide a one way animal gate apparatus which is simple in construction, relatively inexpensive to manufacture, and adapted to be easily placed and installed in an opening in a fence line to allow movement of animals to a desired side of the fence line, but preventing movement of animals in an undesired direction.

These objects as well as other objects of the present invention will become more readily apparent to those skilled in the art to which this invention pertains from a study of the preferred embodiments of the invention as set forth in the specification, drawings and appended claims.

DETAILED DESCRIPTION OF THE INVENTION

Figure 1:
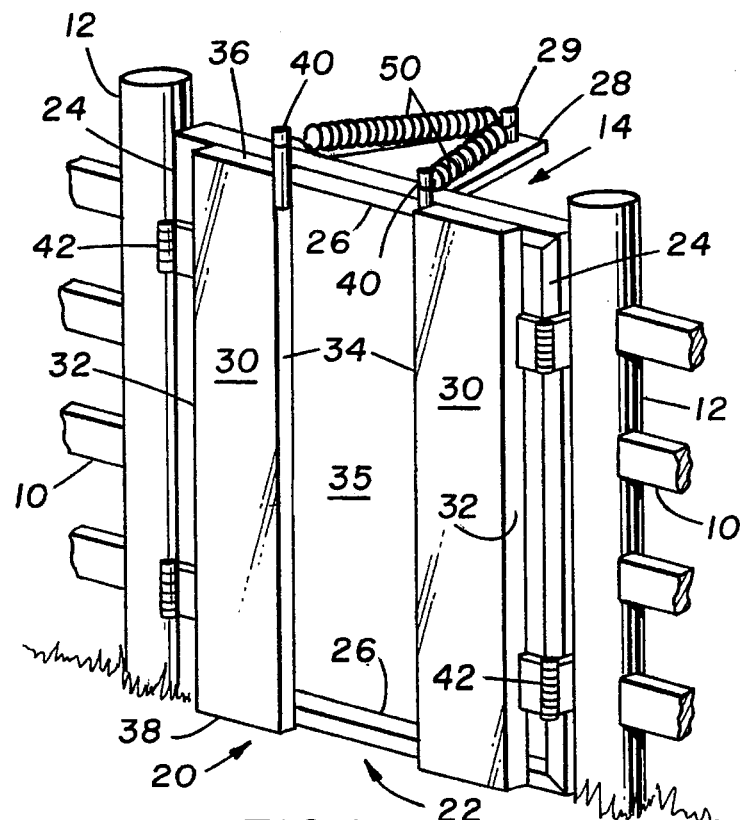
FIG. 1 is a perspective view of a first embodiment of the one way animal gate of the present invention shown in its closed position and installed between two posts of a fence.

Referring now to the drawings, reference numeral 10 designates a fence dividing two tracts of land such as pastures, paddocks and the like for holding animals such as cattle, horses, pigs and the like. As is common, such a fence has one or more openings 14 therein separated by vertical posts 12 which support the fence. As shown, fence 10 is comprised of a plurality of horizontally extending planks or boards, but it is understood that fences for holding animals are often made of barbed wire or other materials.

Reference numeral 20 designates the one way gate apparatus of the present invention. Gate 20 includes a generally rectangular frame 22, a pair of doors 30, and a plurality of hinges 42 for securing the doors 30 to the frame 22. Frame 22 includes a pair of spaced, vertical members 24 and a pair of spaced, horizontal, members 26 with the upper horizontal member 26 having a horizontally extending plate 28 with a pin 29 extending vertically therefrom. Each vertical member 24 is attached to a respective post 12 by any conventional means such as nuts and bolts, nails or the like and has a door 30 pivotally secured thereto by one or more hinges 42. Each door 30 is generally rectangular in shape and includes a first side edge 32, a second side edge 34, an upper edge 36, a lower edge 38, and a pin 40 extending therefrom at a location adjacent the second side edge 34 and upper edge 36. The second side edges 34 of the doors 30 provide a gap 35 therebetween of a size in the order of the distance between the ears of the animals within the fenced areas. As seen in FIG. 1, gap 35 is an unobstructed opening. A pair of coiled springs 50, each having a first end secured by any conventional means such as a fastener, ring or the like to the pin 29 extending from plate 28 and a second end secured by any conventional means such as a fastener, ring or the like to a respective pin 40 of a respective door 30, normally urge the doors 30 to their closed position as depicted in FIG. 1.

Figure 3:
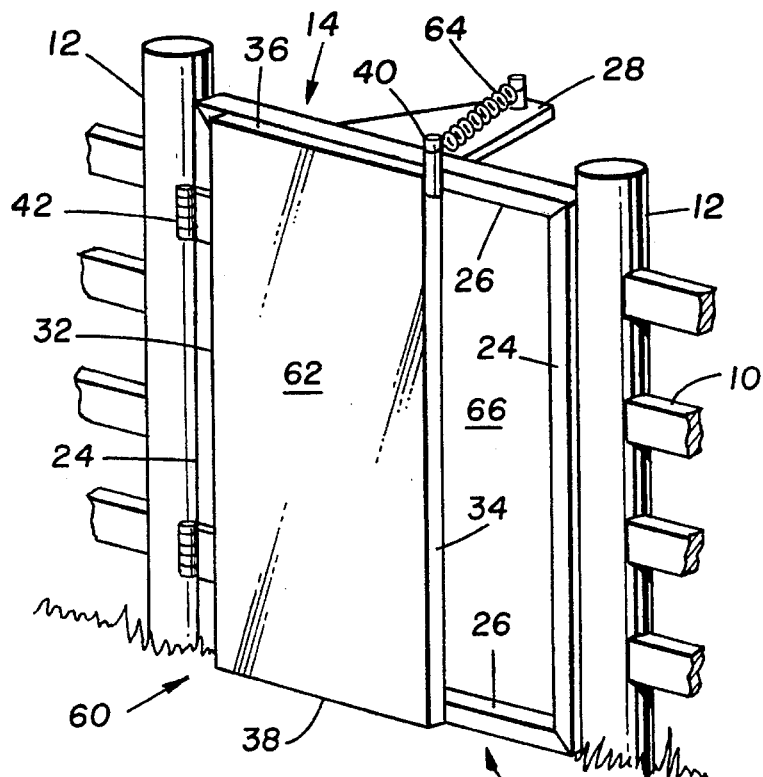
FIG. 3 is a perspective view of a second embodiment of the one way animal gate of the present invention shown in its closed position and installed between two posts of a fence.
Figure 4:
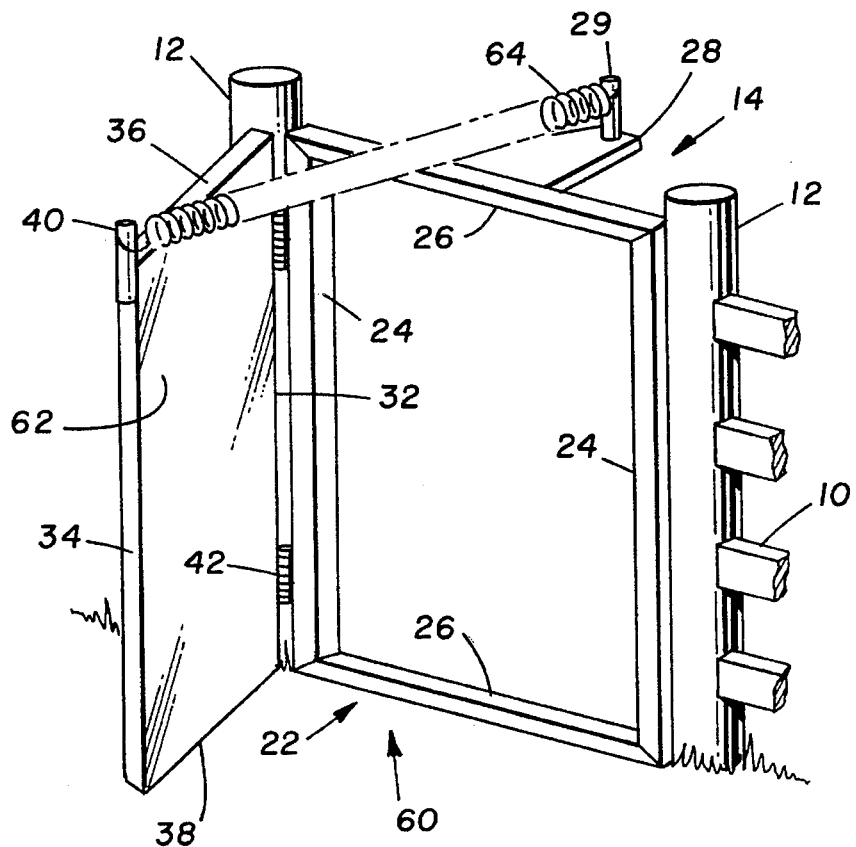
FIG. 4 is a perspective view of the second embodiment of the one way animal gate of the present invention as depicted in FIG. 3, shown in its open position installed between two posts of a fence.

FIGS. 3 and 4 illustrate a second embodiment of the present invention wherein like numerals refer to like parts. As seen in FIGS. 3 and 4, one way gate 60 is shown to include only one door or door panel 62 and a single coil spring 64 with the gap 66 being between the second side edge 34 of the door panel 62. As seen in FIG. 3, gap 66 is an unobstructed opening.

The various components of the one way gate apparatuses 20 and 60 can be made from any of several common and well known materials. For example, each of doors 30 and/or door 62 and frame 22 could be made of either steel, wood or a plastic material.

Figure 2:
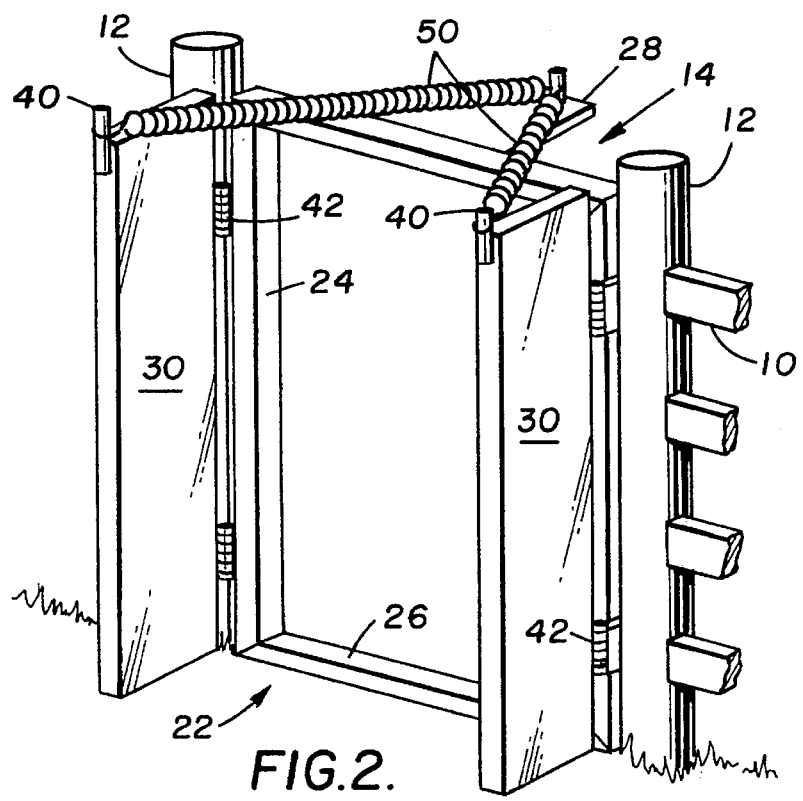
FIG. 2 is a perspective view of the first embodiment of the one way animal gate of the present invention as depicted in FIG. 1, shown in its opened position and installed between two posts of a fence.

In operation, if an animal approaches gate apparatus 20 of the first embodiment of the present invention from the direction that the plate 28 extends from the upper horizontal member 26 of frame 22, the animal, in view of its natural tendency to place its head into a gap or opening, may place its head into the gap 35 between the second side edges 34 of doors 30, and by moving forward, the animal can open the doors 30 to the positions depicted in FIG. 2 and proceeding through the gate apparatus 20 to the other side of the fence. Once on the other side of the fence, the springs 50 close the doors to the positions depicted in FIG. 1, thus the animal cannot return to the original side of the fence due to the engagement of the upper and lower edges 36 and 38 of the doors 30 with the upper and lower horizontal members 26 of frame 22. As is readily apparent, the gate apparatus 60 of the second embodiment of the present invention operates similarly to that of the first embodiment of the present invention.

It is to be understood that the "closed position" referred to herein is used to described the position of the door or doors as shown in FIGS. 1 and 3, i.e. the position that prevents an animal from passing through the gate while still maintaining a space through which the animal's head may extend.

While the above description constitutes preferred embodiments of the present invention, it will be appreciated that the invention is susceptible to modification, variation and change without departing from the proper scope and fair meaning of the accompanying claims. For example, there need not be a pair of spaced horizontal, members of the frame as one horizontal member would be adequate to act as a stop and prevent movement of the doors or door beyond a certain point when the doors reach their closed positions. Furthermore, coiled springs are not necessary for urging the doors or door to their closed positions as other conventional means such as weights attached to one end of a cable secured at its other end to the doors or door would suffice for urging the doors or door to their closed positions. Still furthermore, latch means could be provided on each door and the frame of the gate to prevent movement of animals in either direction if such was desired. Furthermore still, the doors or door could be pivotally secured directly to the vertical posts forming the opening in the fence line, thus eliminating the need for the frame, particularly the vertical members.

I claim:

1. A one way gate apparatus which permits passage of animals in one direction and prevents passage of animals in the opposite direction, said gate apparatus comprising:

a pair of spaced vertical support means including a pair of anchored posts for supporting a first upper, substantially horizontal bar therebetween;

a first generally rectangular door having first and second side edges, an upper edge and a lower edge;

first means for pivotally securing said first side edge of said first door to one of said pair of vertical support means;

a second generally rectangular door having first and second side edges, an upper edge and a lower edge;

second means for pivotally securing said first edge of said second door to the other of said pair of vertical support means;

said first and second doors being movable between closed and opened positions with a gap being positioned between said second side edges thereof when said doors are in their closed position, said gap defining a single unobstructed opening extending between said second sides of said first and second doors;

closure means for normally urging said first and second doors to their said closed positions, said closure means being secured between said doors and said first substantially horizontal member; and said upper edge of said doors engageable with said first, upper substantially horizontal bar of said frame to prevent movement of said doors beyond their closed positions.

2. A one way gate as set forth in claim 1 including a substantially rectangular frame mounted between said pair of anchored posts, said frame defined by said first, upper substantially horizontal bar, a second substantially horizontal bar disposed in spaced relation with said first, upper extending bar, and a pair of spaced vertical members, said first and second spaced, substantially horizontal bars having ends which are secured to said spaced vertical members, said second, substantially horizontal bar disposed for engagement by said doors when said doors are in said closed position.

3. A one way gate as set forth in claim 2 wherein said first and second doors are pivotally secured to respective vertical members of said pair of vertical members.

4. A one way gate as in claim 1 including a transverse closure support member secured to and transversely extending from said first, upper substantially horizontal bar, and, wherein said closure means comprises a pair of springs, each spring being secured respectively to one of said doors and to said transverse closure support member.

5. A one way gate apparatus which permits passage of animals in one direction and prevents passage of animals in the opposite direction, said gate apparatus comprising:

a pair of spaced vertical support means, including a pair of anchored posts for supporting a first, upper spaced, substantially horizontal bar therebetween;

a single, generally rectangular door having first and second side edges, an upper edge and a lower edge;

means for pivotally securing said first side edge of said door to a first of said pair of vertical support means;

said door being movable between closed and opened positions with a gap being positioned between said second side edge of said door and the second of said vertical support means when said door is in said closed position, said gap defining a single unobstructed opening extending between said second side of said door and said second of said vertical support means;

closure means for normally urging said door to said closed position, said closure means being secured between said door and said first, upper substantially horizontal member; and said upper edge of said door engageable with said first upper substantially horizontal bar of said frame to prevent movement of said door beyond its closed position.

6. A one way gate as set forth in claim 5 including a substantially rectangular frame, mounted between said pair of anchored posts, said frame defined by said first upper, substantially horizontal bar, a second substantially horizontal bar disposed in spaced relation with said first upper extending bar, and a pair of spaced vertical members, said first and second spaced, substantially horizontal bars having ends which are secured to said vertical members, said second, substantially horizontal bar disposed for engagement by said door when said door is in said closed position.

7. A one way gate as set forth in claim 6 wherein said door is pivotally secured to one of said vertical members of said pair of vertical members.

8. A one way gate as in claim 5 including a transverse closure support member secured to and transversely extending from said first, upper substantially horizontal bar, and, wherein said closure means comprises a spring secured to said door and to said transverse closure support member.

* * * * *